W. F. BUSCHARDT.
PLANT SUPPORTING CLIP.
APPLICATION FILED JULY 28, 1919.

1,338,612.  
Patented Apr. 27, 1920.

WITNESS:  
H. B. Kirkman

William F. Buschardt  
INVENTOR.  
BY  
Victor J. Evans  
ATTORNEY.

UNITED STATES PATENT OFFICE.

WILLIAM F. BUSCHARDT, OF BALTIMORE, MARYLAND.

PLANT-SUPPORTING CLIP.

1,338,612.  Specification of Letters Patent.  Patented Apr. 27, 1920.

Application filed July 28, 1919. Serial No. 313,671.

*To all whom it may concern:*

Be it known that I, WILLIAM F. BUSCHARDT, a citizen of the United States, residing at Baltimore, State of Maryland, have invented new and useful Improvements in Plant-Supporting Clips, of which the following is a specification.

This invention relates to horticultural devices, particularly to plant supports, and has for its object the provision of a readily bendable wire clip adapted for engagement upon a supporting stake or cord and also adapted for engagement with the stem of a blossom whereby to hold the stem and consequently the blossom in an erect position which will prevent bending and subsequent breaking of the stem, as during a heavy rain.

An important object is the provision of a clip of this character formed from a single length of malleable wire adapted for disposition in encircling relation to a supporting stake or cord and a stem and compressible whereby, owing to the material, it will remain in fixed position.

An additional object is the provision of a device of this character which may be manufactured at trifling cost, which will be highly efficient in use, and a general improvement in the art.

Figure 1:
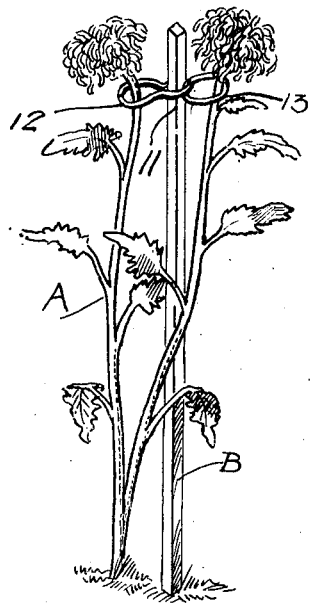
Figure 3:
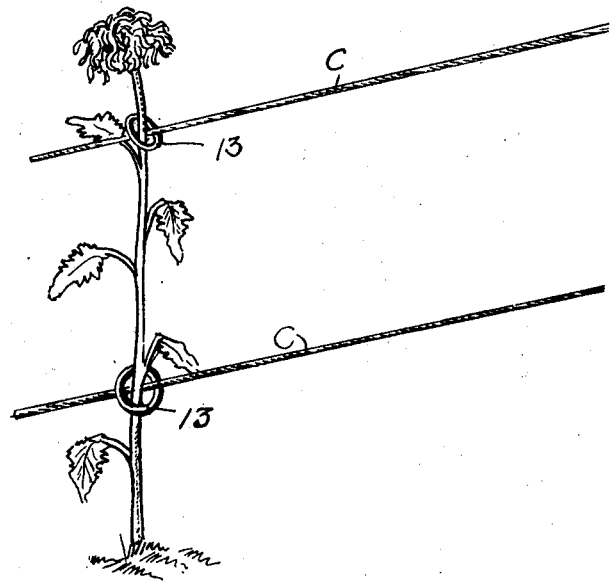
Figure 2:
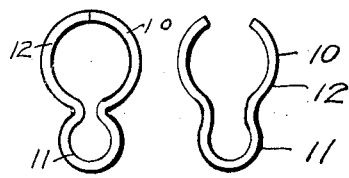
Figure 4:
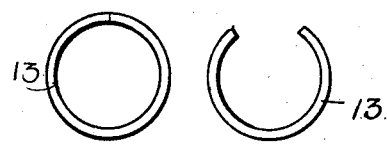

With the above and other objects and advantages in view, the invention consists in the details of construction to be hereinafter more fully described and claimed, and illustrated in the accompanying drawing in which Figure 1 is a perspective view of a plant, supporting stake, and my device in position, showing one form of my device, Fig. 2 is a detail view of this form of the clip, Fig. 3 is a view similar to Fig. 1, showing a slightly modified form of clip engaged upon a plant and upon a supporting cord therefor, and Fig. 4 is a detail view of this form of clip.

Referring more particularly to the drawings and especially the form illustrated in Figs. 1 and 2, the letter A designates a plant which, in the present instance, is supposed to represent a chrysanthemum, though there is no restriction as to the plant with which the device is adapted to be used, the chrysanthemum being chosen since it commonly has two blossom stems on each plant. The letter B designates a stake which may be wood or it may be of stiff wire or a rod, and such as is commonly employed by nurserymen.

In carrying out my invention I provide a clip designated by the numeral 10, which is formed of malleable wire of suitable weight or gage and which is shaped as most clearly shown in Fig. 2, to provide a partially closed loop 11 of relatively small diameter and an open loop 12 of relatively large diameter communicating with the small loop. The small loop 11 is adapted for engagement upon the stem B and the large loop 12 is adapted for engagement with the stem of the plant or the blossom, as desired. In applying the clip it is of course understood that the larger loop is normally in open position or if not it may be readily opened and may be readily engaged upon the stake with the stem engaging within the smaller loop and then engaged upon the stem and it will be apparent that the leaves upon the stem will prevent the clip from slipping down the stem. As the plant grows and it is necessary from time to time to raise whatever support is used it will be found that my device is particularly advantageous as the clip may be readily opened up and raised along the stake and reëngaged upon the stem at the new position to properly support the bloom.

In some instances, as when for example, it is desired to support a chrysanthemum or other plant which has a plurality of blossoms, I may make use of an auxiliary clip 13 which may be circular, as shown in Fig. 1, or elongated, as shown in Fig. 4, and this auxiliary clip is engaged upon the smaller loop 11 and then upon a blossom stem, as clearly shown in Fig. 1.

In some instances it is customary to support the plants from cords, designated by the letter C in Fig. 3, and it will be apparent that either form of my clip may be used upon the cords, though I preferably employ the form shown in Figs. 3 and 4. In the application of this form it is of course obvious that the open or opened clip 13 is engaged upon the cord and also upon the stem of the plant or blossom. Regardless of which form of clip is used and also regardless of the type of support upon which it is used, it is understood that after being placed in position, the sides of the clip must be pressed together to close the loop to prevent accidental disengagement from the plant stem.

From the foregoing description and a study of the drawing it will be apparent that I have thus provided a very simple and efficient supporting device whereby plant or flower stems may be adequately supported to prevent falling over and subsequent damage.

Having thus described my invention, I claim:

In combination with a relatively rigid supporting member, a plant stem holding clip comprising a single length of wire bent intermediate its ends to provide a partially open loop of relatively small diameter and also bent to provide an open loop of relatively large diameter, the smaller loop being adapted for engagement upon said support and the larger loop being adapted for engagement upon the stem of a plant or blossom, the material of the clip being malleable whereby upon application of pressure thereto said normally open loop may be closed.

In testimony whereof I affix my signature.

WILLIAM F. BUSCHARDT.